US012754628B2

(12) United States Patent
Kim

(10) Patent No.: US 12,754,628 B2
(45) Date of Patent: Oct. 6, 2026

(54) DISPLAY DEVICE AND ELECTRONIC DEVICE USING THE SAME

(71) Applicant: Samsung Display Co., Ltd., Yongin-si (KR)

(72) Inventor: Young Bin Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/086,863

(22) Filed: Mar. 21, 2025

(65) Prior Publication Data

US 2026/0029864 A1 Jan. 29, 2026

(30) Foreign Application Priority Data

Jul. 25, 2024 (KR) ........................ 10-2024-0098767

(51) Int. Cl.
*G06F 3/041* (2006.01)
*G09G 3/3275* (2016.01)

(52) U.S. Cl.
CPC .......... *G06F 3/0412* (2013.01); *G06F 3/0416* (2013.01); *G09G 3/3275* (2013.01); *G06F 2203/04107* (2013.01); *G09G 2330/06* (2013.01)

(58) Field of Classification Search
CPC ................. G06F 3/0412; G06F 3/0416; G06F 2203/04107; G09G 3/3275; G09G 2330/06
See application file for complete search history.

(56) References Cited

U.S. PATENT DOCUMENTS

2017/0315657 A1* 11/2017 Lai ...................... G06F 3/04164
2018/0145114 A1* 5/2018 Sim ...................... H10K 59/131
2023/0004253 A1* 1/2023 Shin ...................... G06F 3/0446
2023/0042028 A1* 2/2023 Lee ...................... G06F 3/04164

FOREIGN PATENT DOCUMENTS

KR 10-2018-0006556 A 1/2018

* cited by examiner

*Primary Examiner* — Kenneth B Lee, Jr.
(74) *Attorney, Agent, or Firm* — Womble Bond Dickinson (US) LLP

(57) ABSTRACT

A display device and an electronic device using the same are disclosed. A display device includes a display panel configured to display images through pixels in a display area, a touch driver circuit configured to detect a touch of a user through a touch sensor of the display panel and generate touch coordinate data, a plurality of data driver circuits configured to apply data voltage to the pixels in the display area, a display driver circuit configured to control driving timing of the plurality of data driver circuits and image display timing of the pixels, and a noise blocking film covering a driver including the plurality of data driver circuits, the display driver circuit, and the touch driver circuit, and configured to block electromagnetic waves from the driver.

16 Claims, 7 Drawing Sheets

DISPLAY DEVICE AND ELECTRONIC DEVICE USING THE SAME

CROSS-REFERENCE TO RELATED APPLICATION

The present application claims priority to and the benefit of Korean Patent Application No. 10-2024-0098767, filed on Jul. 25, 2024 in the Korean Intellectual Property Office, the entire disclosure of which is incorporated herein by reference.

BACKGROUND

1. Field

Aspects of embodiments of the present disclosure relate to a display device and an electronic device using the same.

2. Description of the Related Art

As the information-oriented society evolves, various demands for display devices are increasing. For example, display devices are being employed by a variety of electronic devices, such as smartphones, digital cameras, laptop computers, navigation devices, and smart televisions.

A display device may be a flat-panel display device, such as any of a liquid-crystal display device, a field emission display device, and an organic light-emitting display device. Among such flat-panel display devices, an organic light-emitting display device includes a light-emitting element that can emit light on its own, such that each of the pixels of the display panel can emit light by themselves. Accordingly, a light-emitting display device can display images without a backlight unit that supplies light to the display panel.

Recently, a display device includes a touch sensing module for sensing a user's touch as one of interface means. A touch sensing module includes a touch sensing unit in which touch electrodes are arranged, and a touch driver circuit that detects a change in capacitance between the touch electrodes. Such a touch sensing module may be integrally formed on or may be mounted on a part of the display device where images are displayed.

SUMMARY

According to aspects of embodiments of the present disclosure, a display device and an electronic device using the same that can block electromagnetic waves from display driver circuits and a touch driver circuit of a display panel by forming a noise blocking film covering the display driver circuits and touch driver circuit are provided.

According to another aspect of embodiments of the present disclosure, a display device with the improved printed circuit design structure of a circuit board such that a noise blocking film can be directly connected to a ground terminal of the circuit board without a level difference is provided.

However, aspects and objects of the present disclosure are not limited to the above-mentioned aspects and objects; and other aspects and objects of the present disclosure will be apparent to those skilled in the art from the following descriptions.

According to one or more embodiments of the present disclosure, a display device comprises a display panel configured to display images through pixels in a display area, a touch driver circuit configured to detect a touch of a user through a touch sensing unit, or touch sensor, of the display panel and generate touch coordinate data, a plurality of data driver circuits configured to apply data voltage to the pixels in the display area, a display driver circuit configured to control driving timing of the plurality of data driver circuits and image display timing of the pixels, and a noise blocking film covering a driver unit, or driver, comprising the plurality of data driver circuits, the display driver circuit, and the touch driver circuit, and configured to block electromagnetic waves from the driver.

According to one or more embodiments of the present disclosure, a display device comprises a display panel configured to display images through pixels in a display area, a touch driver circuit configured to detect a touch of a user through a touch sensing unit, or touch sensor, of the display panel and generate touch coordinate data, a plurality of data driver circuits configured to apply data voltage to the pixels in the display area, a display driver circuit configured to control driving timing of the plurality of data driver circuits and image display timing of the pixels, a panel protection plate attached to a rear surface of the display panel and conforming to a shape of the rear surface of the display panel, and a noise blocking film covering a driver unit, or driver, comprising the plurality of data driver circuits, the display driver circuit, and the touch driver circuit, to block electromagnetic waves from the driver.

According to one or more embodiments of the present disclosure, an electronic device includes a display device, wherein the display device comprises a display panel configured to display images through pixels in a display area, a touch driver circuit configured to detect a touch of a user through a touch sensing unit, or touch sensor, of the display panel and generate touch coordinate data, a plurality of data driver circuits configured to apply data voltage to the pixels in the display area, a display driver circuit configured to control driving timing of the plurality of data driver circuits and image display timing of the pixels, and a noise blocking film covering a driver unit, or driver, comprising the plurality of data driver circuits, the display driver circuit, and the touch driver circuit, and configured to block electromagnetic waves from the driver.

According to an aspect of embodiments of the present disclosure, electromagnetic waves from display driver circuits and a touch driver circuit in a display device can be blocked, thereby preventing or substantially preventing deterioration of touch sensitivity of a touch sensing unit due to electromagnetic wave noise, etc.

In addition, according to an aspect of embodiments of the present disclosure, a design structure of a circuit board in a display device is improved such that a noise blocking film is connected to a ground terminal of the circuit board without a level difference, and it is possible to easily dispose and apply the noise blocking film and to increase the efficiency of the noise blocking film.

However, aspects and effects of the present disclosure are not limited to those described above, and other aspects and effects of the present disclosure will be apparent to those skilled in the art from the following descriptions.

BRIEF DESCRIPTION OF THE DRAWINGS

The above and other aspects and features of the present disclosure will become more apparent by describing in further detail some embodiments thereof with reference to the attached drawings.

DETAILED DESCRIPTION

The present disclosure will now be described more fully herein with reference to the accompanying drawings, in which some example embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It is also be understood that when a layer is referred to as being "on" another layer or substrate, it may be directly on the other layer or substrate, or one or more intervening layers may also be present. The same reference numbers indicate the same components throughout the specification.

It is to be understood that, although the terms "first," "second," etc. may be used herein to describe various elements, these elements are not to be limited by these terms. These terms are used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Herein, some embodiments of the present disclosure will be described with reference to the accompanying drawings.

Figure 1:
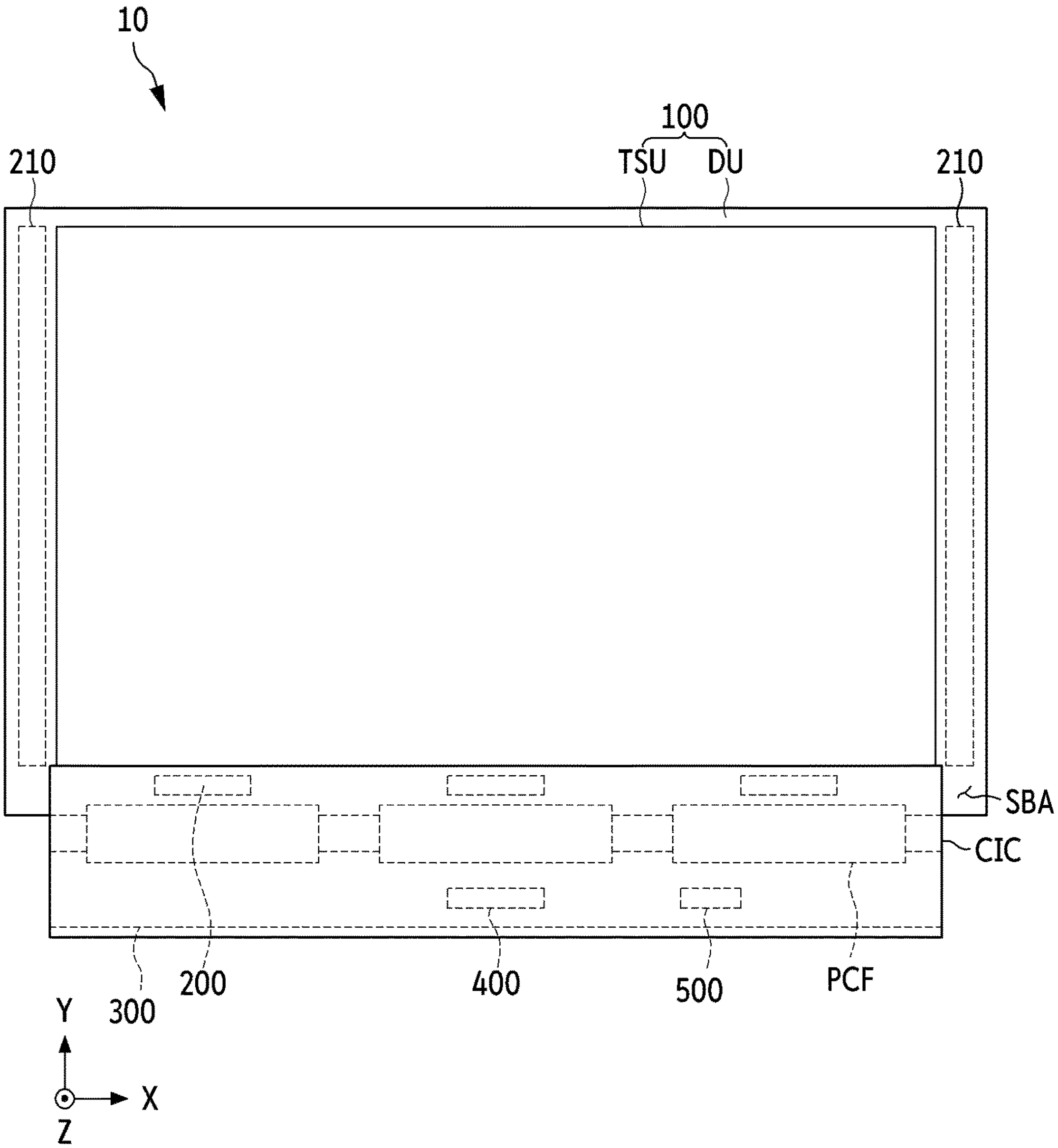
FIG. 1 is a plan view showing a configuration of a display device according to an embodiment of the present disclosure.
Figure 2:
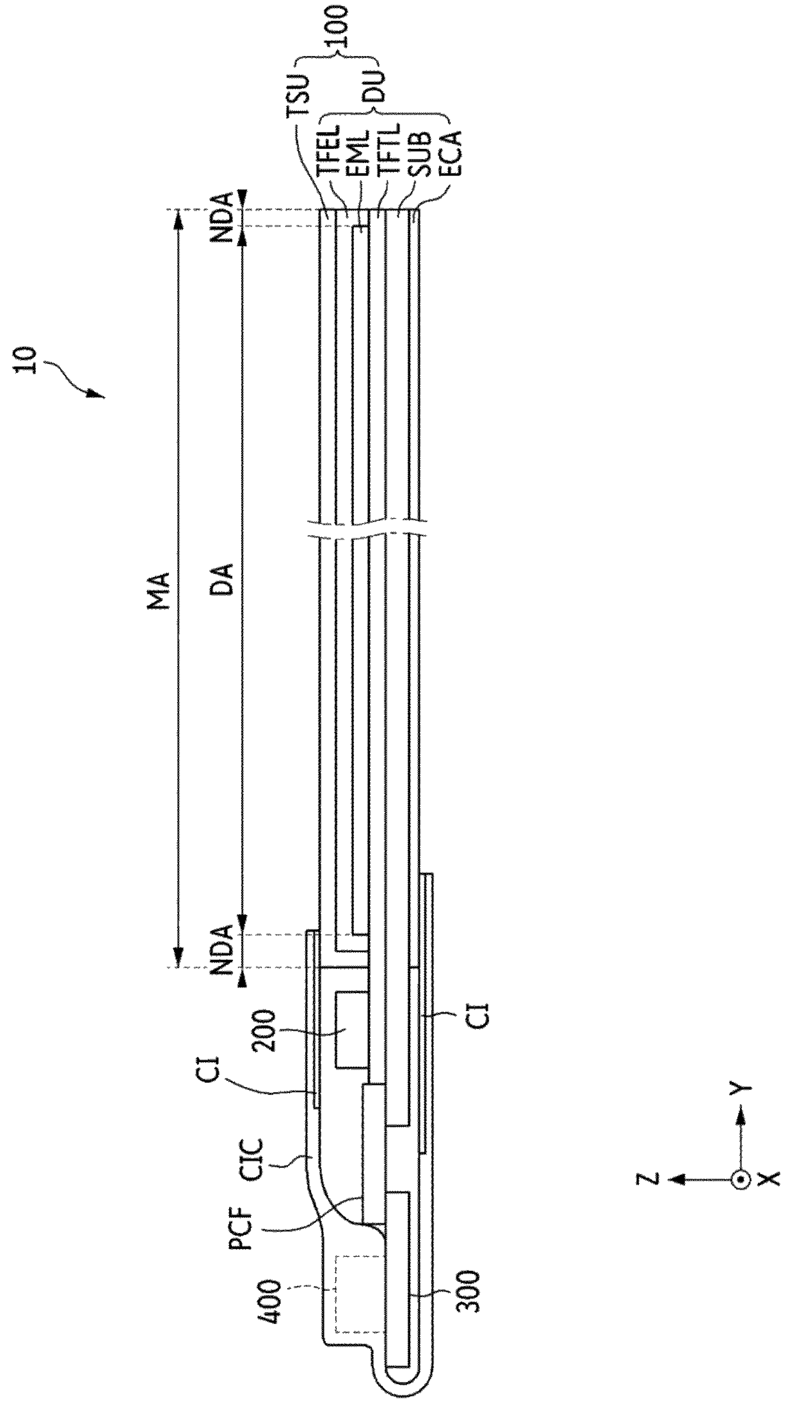
FIG. 2 is a cross-sectional view showing a side of the display device of FIG. 1 according to an embodiment.

FIG. 1 is a plan view showing a configuration of a display device according to an embodiment of the present disclosure; FIG. 2 is a cross-sectional view showing in further detail a side of the display device of FIG. 1 according to an embodiment.

Referring to FIGS. 1 and 2, a display device 10 according to an embodiment may be applied to portable electronic devices, such as mobile phones, smartphones, electronic notebooks, and e-books.

For another example, the display device 10 according to an embodiment may be employed by electronic devices, such as a tablet PC, a portable multimedia player (PMP), a navigation device, an ultramobile PC (UMPC), an e-book, an electronic notebook, and a mobile communications terminal. In addition, the display device 10 may be used as a display unit of a television, a laptop computer, a monitor, an electronic billboard, or the Internet of Things (IoT).

The display device 10 according to an embodiment may be variously classified by a manner in which images are displayed. For example, the display device 10 may be classified into and implemented as an organic light-emitting diode display device (OLED), an inorganic light-emitting display device (inorganic EL), a quantum-dot light-emitting display device (QED), a micro LED display device (micro-LED), a nano LED display device (nano-LED), a plasma display device (PDP), a field emission display device (FED), a liquid crystal display device (LCD), an electrophoretic display device (EPD), etc. In the following description, an organic light-emitting diode display device (OLED) will be described as an example of the display device. The organic light-emitting disposed display device OLED will be referred to as the display device 10 unless it is necessary to further distinguish a type of the display device 10. It is, however, to be understood that embodiments of the present disclosure are not limited to the organic light-emitting diode display device (OLED), and one of the above-listed display devices or any other suitable display device known in the art may be employed as the display device 10 without departing from the scope of the present disclosure.

As used herein, a first direction (X-axis direction) may be a longer side direction of the display device 10, for example, a horizontal direction of the display device 10. A second direction (Y-axis direction) may be a shorter side direction of the display device 10, for example, a vertical direction of the display device 10. A third direction (Z-axis direction) may refer to a thickness direction of the display device 10.

According to an embodiment of the present disclosure, the display device 10 may have a rectangular shape, a square shape, a circular shape, an elliptical shape, or a quadrangular shape when viewed from the top. For example, if the display device 10 is a mobile device, such as a tablet PC or a foldable device, it may have a rectangular shape in which longer sides are located in the horizontal direction. It is to be understood, however, that the present disclosure is not limited thereto. In an embodiment, the longer sides may be positioned in the vertical direction. In an embodiment, the display device 10 may be installed rotatably such that the longer sides are positioned in the horizontal or vertical direction variably.

In an embodiment, the display device 10 includes a display panel 100, at least one scan driver circuit 210, at least one data driver circuit 200, at least one circuit film PCF, a circuit board 300, at least one display driver circuit 400, and a touch sensing module. The touch sensing module may include a touch sensing unit TSU disposed on a front surface of the display panel 100, and at least one touch driver circuit 500 that generates touch coordinate data of the touch sensing unit TSU. In addition, the display device 10 according to an embodiment may further include a panel protection plate ECA and a noise blocking film CIC.

The display panel 100 of the display device 10 may include a display unit DU to display images, and the touch sensing unit TSU may be disposed on the display panel 100 to sense a part of a human body and/or an electronic pen, for example. The display unit DU of the display panel 100 may include a plurality of pixels and may display images through the plurality of pixels. The touch sensing unit TSU may be mounted on the front surface of the display panel 100 or formed integrally with the display panel 100.

At least one scan driver circuit 210 provides gate scan signals to pixels for each horizontal line through gate lines for each horizontal line in the display unit DU based on a gate control signal from the display driver circuit 400. In doing so, the scan driver circuit 210 sequentially provides the gate scan signals to the gate lines for each horizontal line to sequentially drive the pixels SP for each horizontal line.

In addition, the scan driver circuit 210 provides sensing control signals to the pixels for each horizontal line through sensing control lines for each horizontal line in the display unit DU based on the gate control signal from the display driver circuit 400. The scan driver circuit 210 sequentially provides the sensing control signals to the sensing control lines for each horizontal line and controls a pixel driving voltage for each of the pixels to be output to the data driver circuit 200 for each horizontal line.

The data driver circuit 200 may include at least one data driver integrated circuit. The data driver circuit 200 outputs data voltages according to the image data to the pixels of the display unit DU based on a data drive control signal from the display driver circuit 400. The data driver integrated circuits may provide data voltages to the data lines DL connected to the pixels for each horizontal line every horizontal cycle. In particular, the data driver circuit 200 receives the pixel driving voltage of each of the pixels and performs data compensation processing according to a level of the pixel driving voltage, thereby providing the compensation data voltage to each of the pixels.

The display driver circuit 400 may operate as a main processor or may be formed integrally with the main processor. Accordingly, the display driver circuit 400 may control overall functions of the display device 10. For example, the display driver circuit 400 aligns image data from the outside to provide the image data to the data driver integrated circuits of the data driver circuit 200 and controls the driving timing of the data driver circuit 200. Then, the display driver circuit 400 controls the output timing of gate scan signals and sensing control signals of the scan driver circuit 210. In addition, the display driver circuit 400 generates data control signals to control the data voltage output timing of the data driver integrated circuits included in the data driver circuit 200.

Referring to FIGS. 1 and 2, the display panel 100 may be divided into a main area MA and a subsidiary area SBA. The main area MA may include a display area DA where the pixels for displaying images are disposed, and a non-display area NDA located around the display area DA. In the display area DA, light may be emitted from an emission area or an opening area of each pixel to display an image. Each of the pixels in the display device DA may include a pixel circuit including switching elements, a pixel-defining layer that defines the emission area or the opening area, and a self-light-emitting element.

The non-display area NDA may be an edge region or an outer area of the display area DA. The non-display area NDA may be defined as the edge region of the main area MA of the display panel 100. In the non-display area NDA, the scan driver circuit 210, the data driver circuit 200, and fan-out lines (not shown) that connect the data driver circuit 200 with the display area DA may be formed.

The subsidiary area SBA may be extended from a side of the main area MA. A pad area is formed on a side of the subsidiary area SBA, where a plurality of circuit films PCF is electrically connected. Accordingly, at least one circuit film PCF electrically connected to a pad area of the circuit board 300 may be attached to the pad area on the side of the subsidiary area SBA.

At least one circuit film PCF may have a side connected to the pad area of the subsidiary area SBA and the opposite side connected to the pad area of the circuit board 300. In an embodiment, the circuit film PCF may be made of a flexible material that can be bent, folded, or rolled. In an embodiment, such a circuit film PCF may be formed as an anisotropic conductive layer.

The substrate SUB of the display panel 100 shown in FIG. 2 may be a base substrate or a base member. In an embodiment, the substrate SUB may be of a flat type. In another embodiment, the substrate SUB may be a flexible substrate that can be bent, folded, or rolled. For example, the substrate SUB may include, but is not limited to, a glass material or a metal material. As another example, the substrate SUB may include a polymer resin, such as polyimide PI.

A thin-film transistor layer TFTL may be disposed on the substrate SUB. The thin-film transistor layer TFTL may include a plurality of thin-film transistors forming pixel circuits of the sub-pixels. The thin-film transistor layer TFTL may include gate lines, data lines, voltage lines, gate control lines, fan-out lines for connecting the display driver circuit 400 with the data lines, lead patterns for connecting the display driver circuit 400 with the pads, etc. In an embodiment, the scan driver circuits 210 are formed on a side and an opposite side of the non-display area NDA of the display panel 100, respectively, and each of the scan driver circuits 210 may also include thin-film transistors.

The thin-film transistor layer TFTL may be selectively disposed in the display area DA, the non-display area NDA and the subsidiary area SBA. The thin-film transistors in each of the pixels, the gate lines, the data lines and the voltage lines in the thin-film transistor layer TFTL may be disposed in the display area DA. The gate control lines and the fan-out lines in the thin-film transistor layer TFTL may be disposed in the non-display area NDA. The lead patterns of the thin-film transistor layer TFTL may be disposed in the subsidiary area SBA.

The emission material layer EML may be disposed on the thin-film transistor layer TFTL. The emission material layer EML may include a plurality of light-emitting elements in each of which a first electrode, an emissive layer and a second electrode are stacked on one another sequentially to emit light, and a pixel-defining film for defining each of the sub-pixels. Light-emitting elements of the emission material layer EML may be disposed in the display area DA.

An encapsulation layer TFEL may cover upper and side surfaces of the emission material layer EML and protect the emission material layer EML. The encapsulation layer TFEL may include at least one inorganic layer and at least one organic layer for encapsulating the emission material layer EML.

The touch sensing unit TSU including a touch sensing area may be disposed on the encapsulation layer TFEL of the display panel 100. The touch sensing area of the touch sensing unit TSU may include a plurality of touch electrodes for sensing a user's touch by capacitive sensing, and touch driving lines connecting the plurality of touch electrodes with at least one touch driver circuit 500. In each touch sensing area, touch electrodes may be arranged in a matrix to sense a user's touch by self-capacitance sensing or mutual capacitance sensing.

In an embodiment, the touch sensing unit TSU may not be formed integrally with the display panel 100 but may be disposed on a separate substrate or film disposed on the display unit DU of the display panel 100. In such a case, the substrate of the film supporting the touch sensing unit TSU may be a base member encapsulating the display unit DU. Herein, an example in which the touch sensing unit TSU is formed integrally with the front surface of the display unit DU will be described.

In an embodiment, the touch electrodes may be disposed in the touch sensing area overlapping with the display area DA. In an embodiment, touch lines transmitting touch driving signals or touch sensing signals may be arranged in a touch peripheral area overlapping with the non-display area NDA.

The touch driver circuit 500 that generates touch coordinate data on the touch sensing area may be disposed in the non-display area NDA or the subsidiary area SBA of the display panel 100, or mounted on the circuit board 300. In an embodiment, the touch driver circuit 500 may be implemented as an integrated circuit (IC).

The touch driver circuit 500 supplies the touch driving signals to the touch electrodes of the touch sensing area overlapping with the display area DA, and measures the amount of a change of charges in mutual capacitance of each of a plurality of touch nodes formed by the touch electrodes. The touch driver circuit 500 measures a change in capacitance of the touch nodes according to a change the amount of voltage or current of a touch sensing signal received through the touch electrodes. In this manner, the touch driver circuit 500 may determine a location of the user's touch based on an amount of a change in the mutual capacitance of each of the touch nodes. The touch driving signal may be a pulse signal having a certain frequency (e.g., a predetermined frequency). The touch driver circuit 500 may determine whether there is a touch by a touch input means or a part of a user's body, such as a finger, and may find the coordinates of the touch, if any, for each touch sensing area based on the amount of the change in the capacitance between the touch electrodes for each of the touch sensing areas.

As shown in FIG. 2, in an embodiment, at least one circuit film PCF and the circuit board 300 may be arranged in parallel to the display panel 100 as a flat plane. In another embodiment, when a plurality of circuit films PCF is bent, the opposite side of the circuit films PCF and the circuit board 300 may overlap with the main area MA in the thickness direction (Z-axis direction).

In an embodiment, the data driver circuit 200 may be implemented as a plurality of integrated circuits (IC) and may be attached on the display panel 100 by a chip-on-glass (COG) technique, a chip-on-plastic (COP) technique, or ultrasonic bonding. For example, the data driver circuit 200 may be disposed in the subsidiary area SBA. In another embodiment, the data driver circuits 200 may be mounted on the circuit films PCF or the circuit board 300.

The display driver circuit 400 and the touch driver circuit 500 may be mounted on the circuit board 300. In an embodiment, the display driver circuit 400 and the touch driver circuit 500 may be formed integrally. The display driver circuit 400 and the touch driver circuit 500 may be implemented as integrated circuits IC.

The circuit board 300 may be electrically connected to the pad area of the display panel 100 by at least one circuit film PCF. In an embodiment, lead patterns of the circuit board 300 may be electrically connected to the pad area of the display panel 100 through the respective input and output pads and at least one circuit film PCF. The circuit board 300 may be a flexible printed circuit board (FPCB), a printed circuit board (PCB), or a flexible film such as a chip-on-film (COF).

The circuit board 300 is electrically connected to at least one circuit film PCF with the display driver circuit 400 and the touch driver circuit 500 mounted thereon. The pad area of the circuit board 300 includes a plurality of input and output pads and at least one ground pad.

The circuit board 300 may apply a ground voltage to at least one noise blocking film CIC and at least one circuit film PCF connected to at least one ground pad through at least one ground pad.

The panel protection plate ECA is formed into a plate shape conforming to a shape of a rear surface of the display panel 10. The panel protection plate ECA is disposed and attached to the rear surface of the display panel 100 so as to conform to the shape of the rear surface of the display panel 100.

In an embodiment, the panel protection plate ECA may include a flat elastic member in a shape conforming to the shape of the rear surface of the display panel 100 and attached thereto, and a metal plate in a same shape as the elastic member attached to the rear surface of the elastic member. The elastic member of the panel protection plate ECA is attached to the rear surface of the display panel 100, and the flat metal plate covers both the elastic member and the rear surface of the display panel 100. The flat metal plate is electrically connected to the ground pad of the circuit board 300 through the noise blocking film CIC, and, accordingly, a ground voltage is applied to the flat metal plate. Accordingly, the panel protection plate ECA can protect the display panel 100 from external impact, static electricity, and electromagnetic waves.

The noise blocking film CIC is disposed to cover a driver circuit unit, or driver, including the display driver circuit 400, the touch driver circuit 500, and at least one data driver circuit 200, thereby blocking electromagnetic waves from the driver circuits.

The noise blocking film CIC covers the driver circuit unit, which includes at least one circuit board 300 on which the display driver circuit 400 and the touch driver circuit 500 are mounted, at least one circuit film PCF, and at least one data driver circuit 200.

In an embodiment, the noise blocking film CIC may be formed as an anisotropic conductive film with a thin-film metal pattern CI made of aluminum, copper, or an alloy material patterned on a surface in a mesh pattern or included therein. In an embodiment, the noise blocking film CIC may be formed as a metal mesh having a thin-film structure in which a thin-film metal pattern CI made of aluminum, copper, or an alloy material is formed in a mesh pattern.

In an embodiment, the noise blocking film CIC may be formed in a polygonal shape, such as a rectangle. An outer surface thereof at an end may be in contact with a front or side surface of the display panel 100 where images are displayed. The outer surface of the noise blocking film CIC at an opposite end may be in contact with the panel protection plate ECA disposed on the rear surface of the display panel 100, and the metal pattern CI of the noise blocking film CIC may be electrically connected with and attached to at least one ground pad formed on the circuit board 300.

Figure 3:
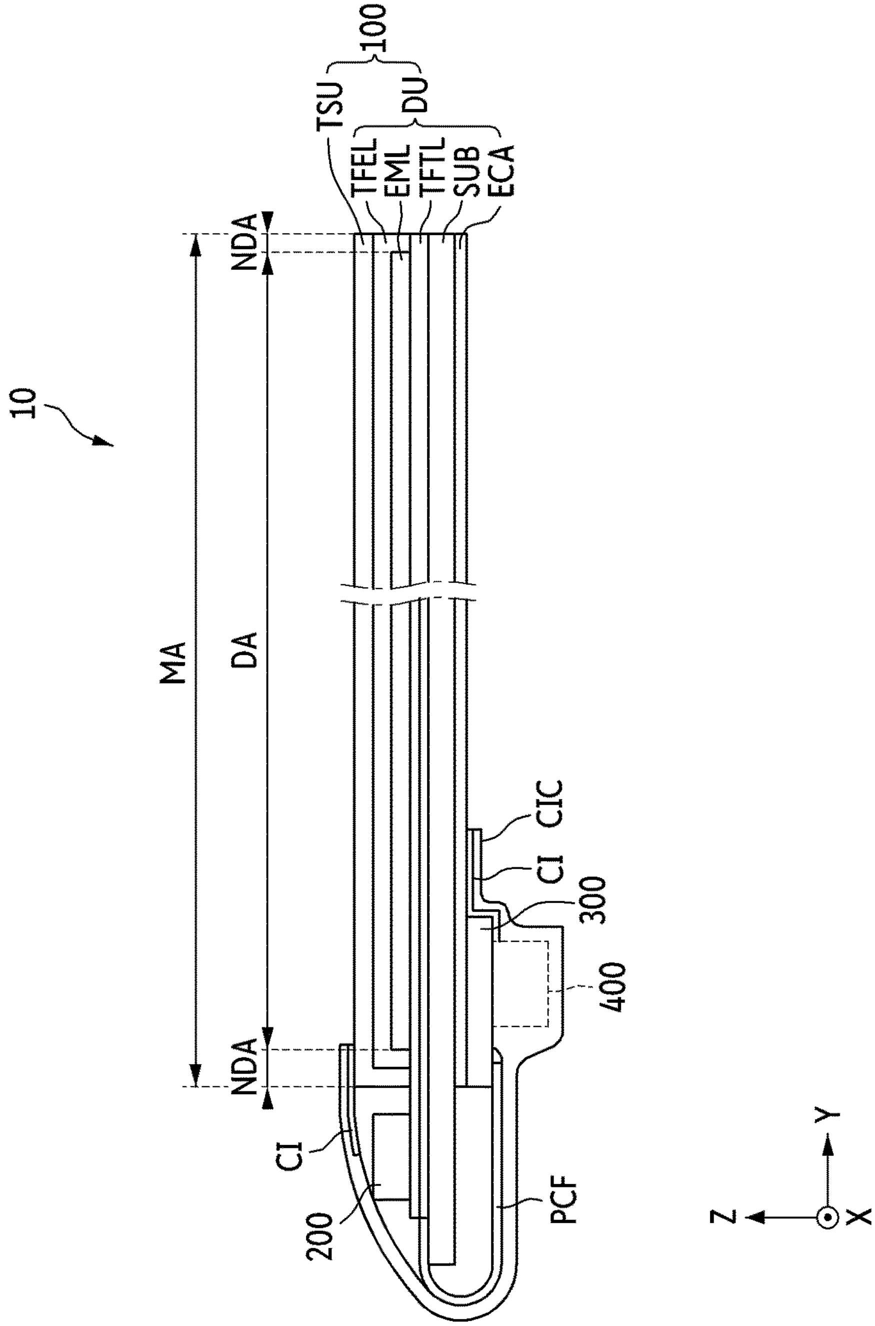
FIG. 3 is a cross-sectional view showing a side of the display device of FIG. 1 according to another embodiment.

FIG. 3 is a cross-sectional view showing a side of the display device of FIG. 1 according to an embodiment.

Referring to FIG. 3, when a plurality of circuit films PCF is bent, the display panel 100 and the circuit board 300 may be formed as being bent. Opposite sides of the circuit films PCF connected to the display panel 100 and the circuit board

300 connected to the opposite side of the circuit films PCF may overlap with the main area MA in the thickness direction (Z-axis direction).

In an embodiment, the noise blocking film CIC covers all of at least one circuit board 300, and the display driver circuit 400 and the touch driver circuit 500 mounted on the circuit board 300, which are bent.

In an embodiment, the noise blocking film CIC is formed in a polygonal plane shape. An outer surface thereof at an end is in contact with and attached to the front or side surface of the display panel 100, and the outer surface at an opposite end of the noise blocking film CIC is in contact with and attached to the panel protection plate ECA disposed on the rear surface of the display panel 100. The metal pattern CI of the noise blocking film CIC is electrically connected with and attached to at least one ground pad formed on the circuit board 300. Accordingly, ground voltage may be applied in real time to the front or side surface of the display panel 100, and to the panel protection plate ECA as well as the noise blocking film CIC.

Figure 4:
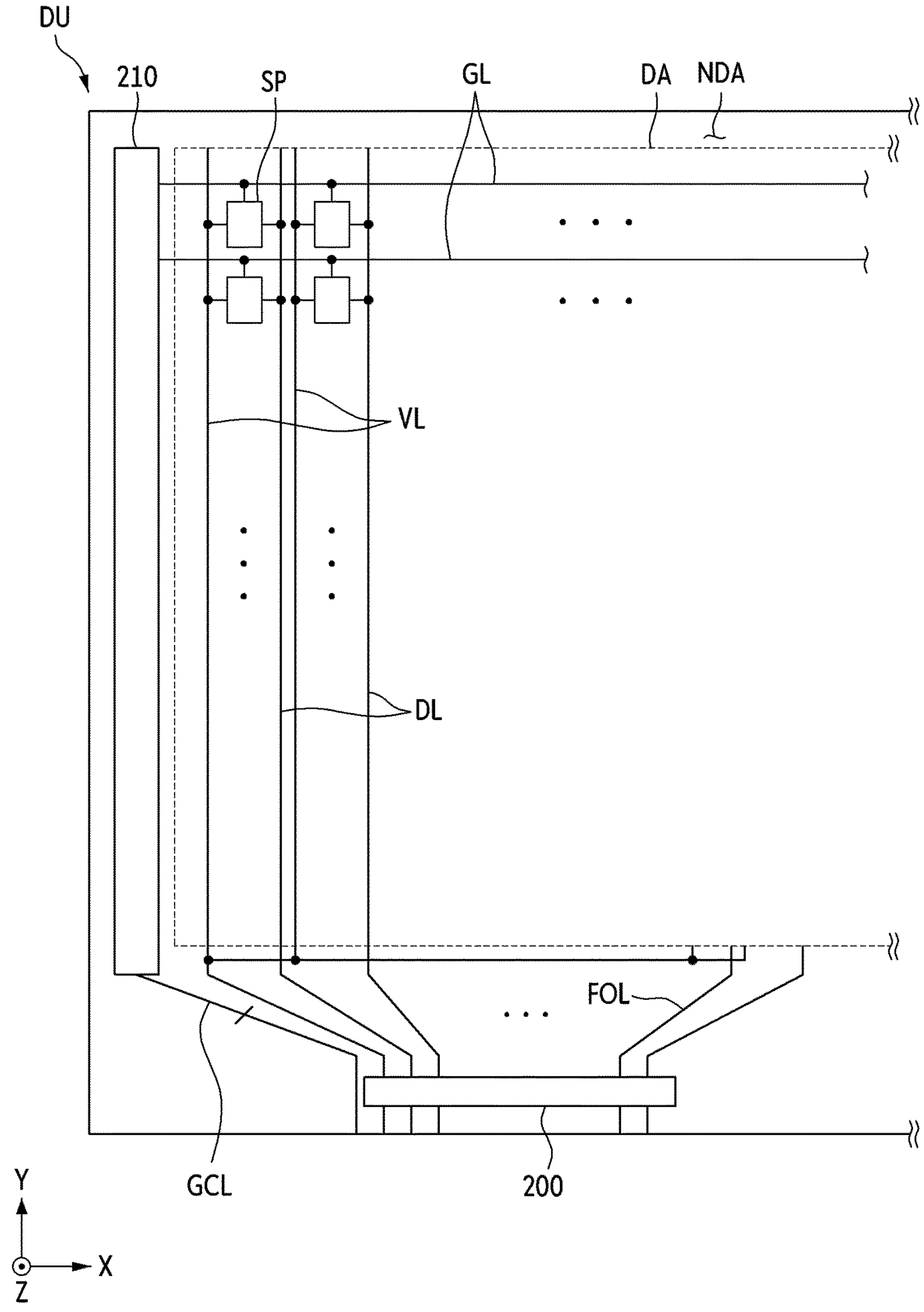
FIG. 4 is a view showing a layout of an example of a display panel according to an embodiment of the present disclosure.

FIG. 4 is a view showing the layout of an example of a display panel according to an embodiment of the present disclosure. FIG. 4 is a view showing a layout of a part of the display area DA and the non-display area NDA of the display unit DU before the touch sensing unit TSU is formed.

The display area DA displays images therein and may be defined as a central area of the display panel 100. For example, the display area DA may include a plurality of sub-pixels SP, a plurality of gate lines GL, a plurality of data lines DL, a plurality of voltage lines VL, etc. Each of the plurality of sub-pixels SP may be defined as a minimum unit that outputs red light, green light, blue light, white light, etc.

The plurality of gate lines GL may provide the gate signals received from at least one scan driver circuit 210 to the plurality of sub-pixels SP. The plurality of gate lines GL may be extended in the X-axis direction and may be spaced apart from one another in the Y-axis direction crossing the X-axis direction.

The plurality of data lines DL may supply the data voltages received from the display driver circuit 400 to the plurality of sub-pixels SP. The plurality of data lines DL may be extended in the Y-axis direction and may be spaced apart from one another in the X-axis direction.

The plurality of voltage lines VL may apply the supply voltage received from the display driver circuit 400 or a separate power supply unit to the plurality of pixels SP. The supply voltage may be at least one of a driving voltage, an initialization voltage, and a reference voltage. The plurality of voltage lines VL may be extended in the Y-axis direction and may be spaced apart from one another in the X-axis direction.

The non-display area NDA is a peripheral area surrounding the display area DA where images are displayed, and may be defined as a bezel area. The non-display area NDA may include the scan driver circuit 210, fan-out lines FOL, and gate control lines GCL. The scan driver circuit 210 may generate a plurality of gate signals based on the gate control signal, and may sequentially supply the plurality of gate signals to the plurality of gate lines GL in a certain order (e.g., a predetermined order).

The fan-out lines FOL may be extended from the display driver circuit 400 to the display area DA. The fan-out lines FOL may supply the data voltage received from the display driver circuit 400 to the plurality of data lines DL.

The gate control line GCL may be extended from the display driver circuit 400 to the scan driver circuit 210. The gate control line GCL may provide the gate control signal received from the display driver circuit 400 to the scan driver circuit 210.

The display driver circuit 400 may output signals and voltages for driving the display panel 100 to the fan-out lines FOL. The display driver circuit 400 may provide data voltages to the data lines DL through the fan-out lines FOL. The data voltages may be applied to the plurality of sub-pixels SP, such that a luminance of the plurality of sub-pixels SP may be determined. The display driver circuit 400 may provide a gate control signal to the scan driver circuit 210 through the gate control line GCL.

Figure 5:
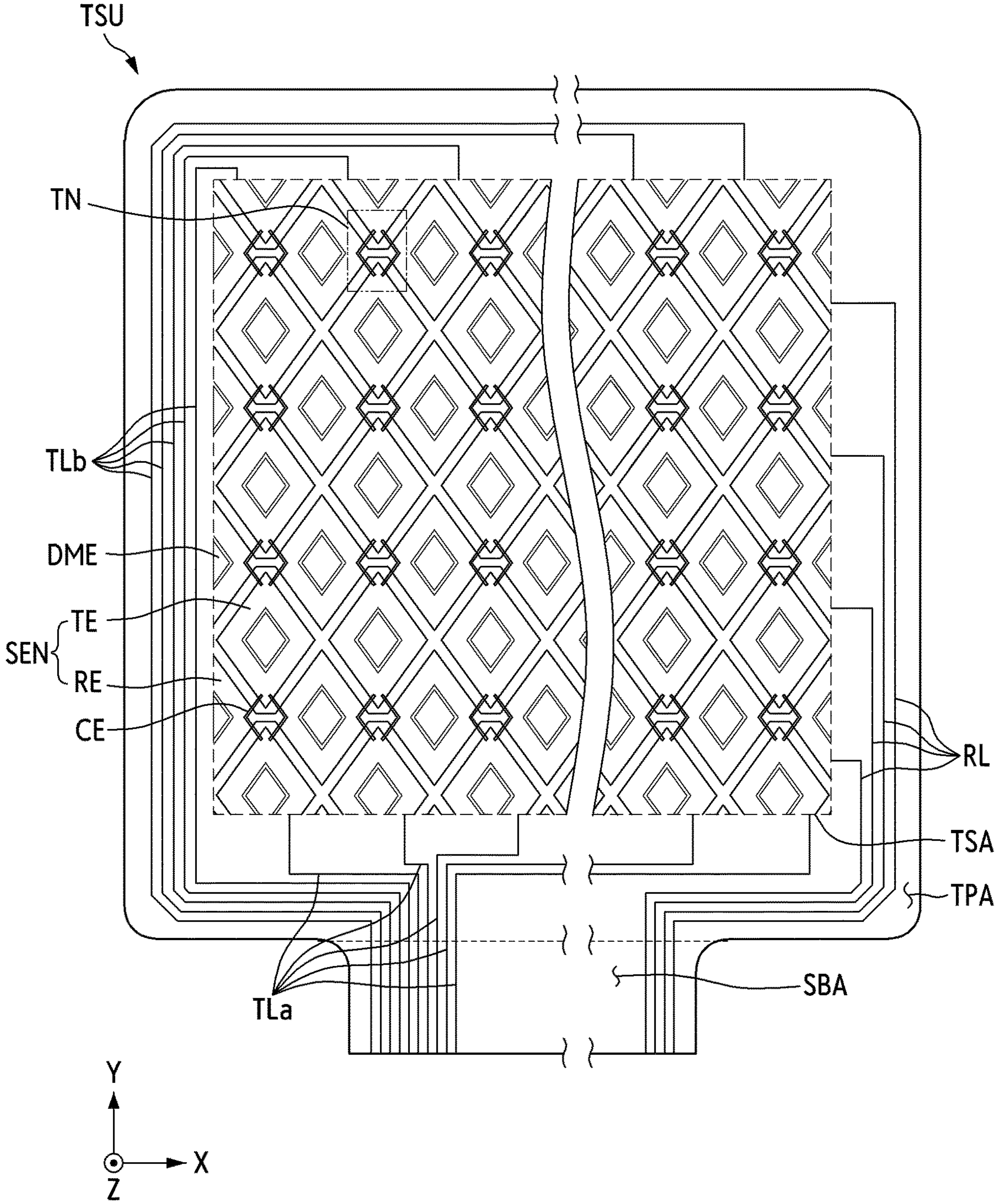
FIG. 5 is a view showing an example of a layout of a touch sensing unit according to an embodiment of the present disclosure.

FIG. 5 is a view showing an example of a layout of a touch sensing unit according to an embodiment of the present disclosure. FIG. 5 is a view showing a layout of the structure of a touch sensing area TSA corresponding to the display area DA when viewed from the top.

Referring to FIG. 5, the touch sensing unit TSU may include the touch sensing area TSA that senses a user's touch, and a touch peripheral area TPA around the touch sensing area TSA.

The touch sensing area TSA may cover the display area DA and the non-display area NDA of the display unit DU and may overlap with the display area DA and the non-display area NDA. In an embodiment, the non-display area NDA is the bezel area, and the outer areas of the touch sensing area TSA that overlap with and are in line with the non-display area NDA correspond to the bezel area.

The touch peripheral area TPA corresponds to the area in which the scan driver circuit 210 is disposed. Accordingly, the touch sensing area TSA is extended, overlapped, and disposed on the non-display area NDA excluding the area in which the scan driver circuit 210 is disposed.

The touch sensing area TSA may include a plurality of touch electrodes SEN and a plurality of dummy electrodes DME. The plurality of touch electrodes SEN may form mutual capacitance or self-capacitance to sense a touch of an object or a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from one another in the X-axis direction and the Y-axis direction. The driving electrodes TE adjacent in the Y-axis direction may be electrically connected through a plurality of connection electrodes CE.

The plurality of driving electrodes TE may be connected to first touch pads through driving lines TL. The driving lines TL may include lower driving lines TLa and upper driving lines TLb. For example, some of the driving electrodes TE disposed on a lower side of the touch sensing area TSA may be connected to the first touch pads through the lower driving lines TLa, and some others of the driving electrodes TE disposed on the upper side of the touch sensing area TSA may be connected to the first touch pads through the upper driving lines TLb. The lower driving lines TLa may be extended to the first touch pads beyond the lower side of the touch peripheral area TPA. The upper driving lines TLb may be extended to the first touch pads along the upper side, the left side, and the lower side of the touch peripheral area TPA. However, the touch pads (not shown) may be formed on the circuit board 300 or the like and may be connected to at least one touch driver circuit 500.

The driving electrodes TE adjacent to one another in the Y-axis direction may be electrically connected by the plurality of connection electrodes CE. Even if one of the connection electrodes CE is disconnected, the driving electrodes TE can be stably connected through the remaining connection electrodes CE. The driving electrodes TE adjacent to each other may be connected by two connection electrodes CE, but the number of connection electrodes CE is not limited thereto. In an embodiment, the connection electrodes CE may be bent at least once. In an embodiment, the connection electrodes CE may have a shape of an angle bracket "<" or ">", but the shape of the connection electrodes CE when viewed from the top is not limited thereto.

The connection electrodes CE may be disposed on a different layer from the plurality of driving electrodes TE and the plurality of sensing electrodes RE. The driving electrodes TE adjacent to one another in the Y-axis direction may be electrically connected through the connection electrodes CE disposed on a different layer from the plurality of driving electrodes TE or the plurality of sensing electrodes RE. The connection electrodes CE may be formed on the rear layer (or the lower layer) of the layer on which the driving electrodes TE and the sensing electrodes RE are formed. In an embodiment, the connection electrodes CE are electrically connected to the driving electrode TE through a plurality of contact holes. Accordingly, even though the connection electrodes CE overlap with the plurality of sensing electrodes RE in the Z-axis direction, the plurality of driving electrodes TE and the plurality of sensing electrodes RE can be insulated from each other. Mutual capacitance may be formed between the driving electrodes TE and the sensing electrodes RE.

The sensing electrodes RE adjacent to one another in the X-axis direction may be electrically connected to one another through connection portions disposed on the same layer as the plurality of driving electrodes TE or the plurality of sensing electrodes RE. In an embodiment, the plurality of sensing electrodes RE may be extended in the X-axis direction and may be spaced apart from one another in the Y-axis direction. The plurality of sensing electrodes RE may be arranged in the X-axis direction and the Y-axis direction, and the sensing electrodes RE adjacent to one another in the X-axis direction may be electrically connected through the connection portions.

Touch nodes TN may be formed at intersections of the connection electrodes CE connecting between the driving electrodes TE and the connection portions of the sensing electrodes RE. The touch nodes TN may be arranged in a matrix in the touch sensing area TSA.

The plurality of sensing electrodes RE may be connected to second touch pads through sensing lines RL. For example, some of the sensing electrodes RE disposed on the right side of the touch sensing area TSA may be connected to the second touch pads through the sensing lines RL. The sensing lines RL may be extended to the second touch pads along the right side and the lower side of the touch peripheral area TPA. The second touch pads may be connected to at least one touch driver circuit 500 through the circuit board 300.

In an embodiment, each of the plurality of dummy electrodes DME may be surrounded by the driving electrode TE or the sensing electrode RE. Each of the plurality of dummy electrodes DME may be spaced apart from and insulated from the driving electrode TE or the sensing electrode RE. Accordingly, the dummy electrodes DME may be electrically floating.

The touch driver circuit 500 supplies the touch driving signals to the driving electrodes TE. The touch driver circuit 400 receives signals fed back from each of the driving electrodes TE as the touch sensing signals of the driving electrodes TE, and receives touch sensing signals on the sensing electrodes RE from each of the sensing electrodes RE. Accordingly, the touch driver circuit 500 may measure a change in magnitude of the touch sensing signals received from the driving electrodes TE and the sensing electrodes RE, and may measure an amount of charge in mutual capacitance of each of the touch nodes TN formed by the driving electrodes TE and the sensing electrodes RE. The touch driver circuit 500 may determine the position of the user's touch and the touch movement direction based on the amount of change in the mutual capacitance of each of the touch nodes. As described above, the touch driver circuit 500 may determine whether there is a touch by a touch input means or a part of a user's body, such as a finger, and may find the coordinates of the touch, if any, for each of the touch sensing areas based on the amount of the change in the capacitance between the touch electrodes.

Figure 6:
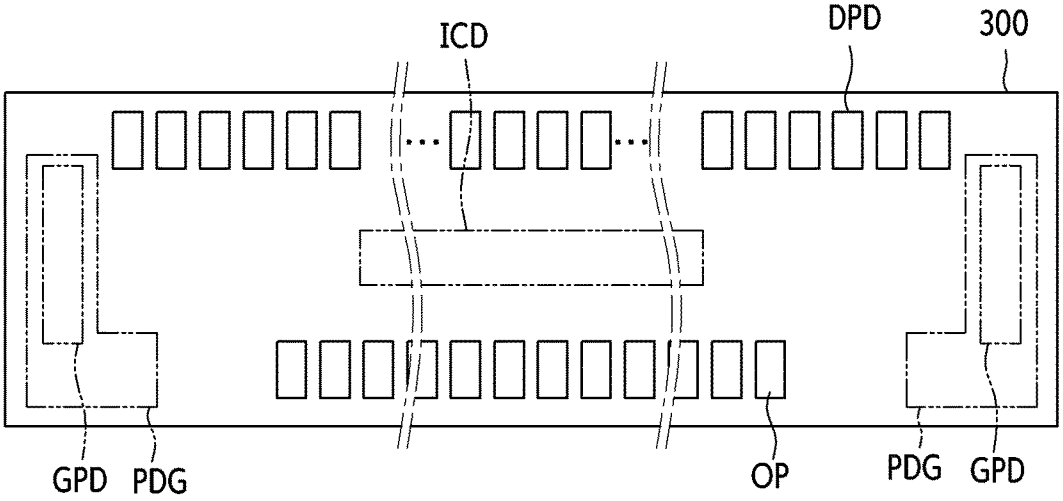
FIG. 6 is a layout diagram showing input/output pad areas of the circuit board and an area where the display driver circuit is disposed shown in FIGS. 1 to 3.
Figure 7:
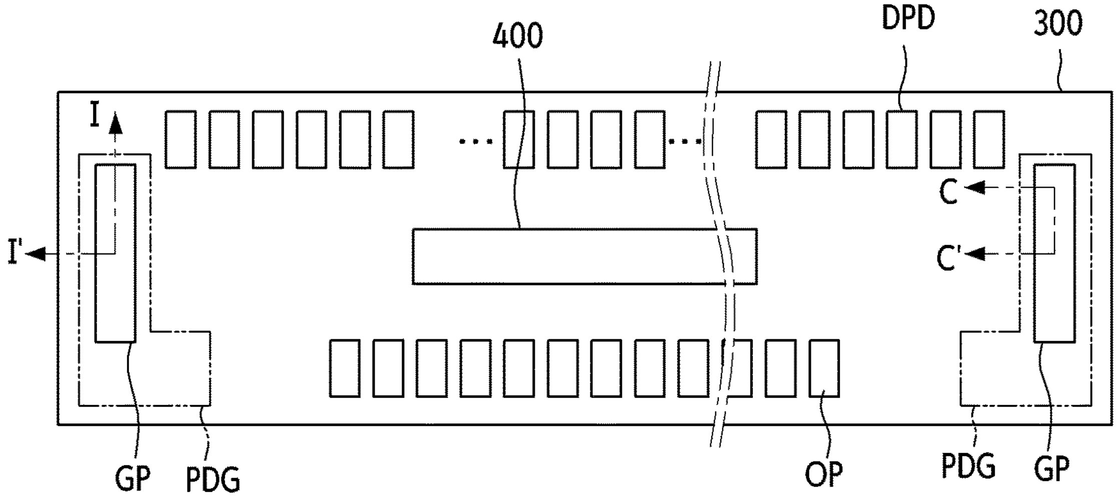
FIG. 7 is a layout diagram showing an arrangement structure of the input/output pads on the circuit board and the display driver circuit shown in FIG. 6.

FIG. 6 is a layout diagram showing input/output pad areas of the circuit board and the area where the display driver circuit is disposed shown in FIGS. 1 to 3. FIG. 7 is a layout diagram showing an arrangement structure of the input/output pads on the circuit board and the display driver circuit shown in FIG. 6.

Referring to FIGS. 6 and 7, the circuit board 300 according to an embodiment includes a plurality of input and output pads DPD and OP, lead patterns, a circuit area ICD, ground areas GPD, and ground open areas PDG.

The input and output pads DPD and OP are patterned or disposed at certain areas (e.g., predetermined pad areas), respectively. The input and output pads DPD and OP may be electrically connected to input/output terminals of integrated circuits (e.g., the display driver circuit 400) mounted in the circuit area ICD through the respective lead patterns. The input and output pads DPD and OP may be disposed in pad areas on a side and another side of the circuit board 300. In an embodiment, the input and output pads DPD and OP and the lead patterns are made of a metal material of any of copper, silver, aluminum, and titanium, or an alloy material.

In at least one circuit area ICD, integrated circuits such as the display driver circuit 400 and the touch driver circuit 500 are mounted. In the circuit area ICD, the protective coating layer as well as the metal layer are removed and opened, such that the mounting surface of an integrated circuit to be seated and mounted in the circuit area ICD is electrically isolated from other floating patterns or other lead patterns and lines in the vicinity. Accordingly, the mounting surface of the display driver circuit 400 seated and mounted in the circuit area ICD is electrically separated from other floating patterns or other lead patterns and lines in the vicinity. In an embodiment, the input/output terminals of the display driver circuit 400 are electrically connected to the respective lead patterns and in turn electrically connected to input and output pads DPD and OP (e.g., predetermined input and output pads DPD and OP).

In at least one ground area GPD, at least one ground pad GP and a ground lead pattern electrically connected to the at least one ground pad GP are patterned or disposed. In an embodiment, at least one ground pad GP and the ground lead pattern may be made of a metal material or an alloy material via a same process as the input and output pads DPD and OP.

The ground open area PDG is formed such that the vicinity and the border of the ground area GPD are open such that at least one ground pad GP and the ground lead pattern are electrically isolated from other floating patterns or other lead patterns and lines in the vicinity.

Figure 8:
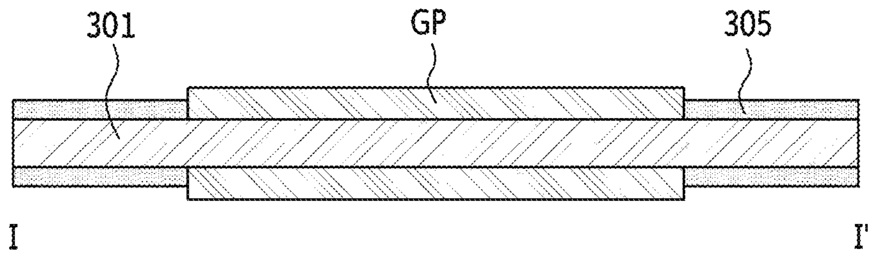
FIG. 8 is a cross-sectional view showing an example of a cross-section taken along the line I-I' of FIG. 7.
Figure 9:
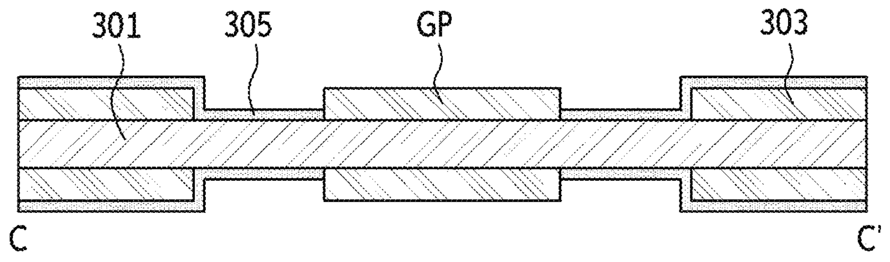
FIG. 9 is a cross-sectional view showing an example of a cross-section taken along the line C-C' of FIG. 7.

FIG. 8 is a cross-sectional view showing an example of a cross-section, taken along the line I-I' of FIG. 7. FIG. 9 is a cross-sectional view showing an example of a cross-section, taken along the line C-C' of FIG. 7.

Referring to FIGS. 8 and 9, the ground open area PDG of the circuit board 300 is formed such that the metal layer 303 is removed such that at least one ground pad GP and the ground lead pattern are electrically isolated from other floating patterns or other lead patterns and lines in the vicinity.

Referring to FIG. 8, in an embodiment, the ground open area PDG of the circuit board 300 may be formed by removing the metal layer 303 from a base film 301 or a base substrate made of a non-conductive material and coving it with a protective coating layer 305. In an embodiment, the ground open area PDG may be formed by removing the protective coating layer 305 as well as the metal layer 303 so as to be open.

Referring to FIG. 9, in an embodiment, the metal layer 303 is disposed on the non-conductive base film 301 or base substrate in the other areas than the ground open area PDG of the circuit board 300, whereas the metal layer 303 is removed only from the ground open area PDG. Accordingly, in the ground open area PDG, the protective coating layer 305 is disposed as a cover on the base film 301 or base substrate made of a non-conductive material from which the metal layer 303 has been removed. In an embodiment, in the ground open area PDG, the protective coating layer 305 as well as the metal layer 303 may all be removed such that the front surface of the base film 301 or base substrate is open. In this manner, the metal pattern CI of the noise blocking film CIC can be connected and attached to the ground pad GP of the circuit board 300 without a level difference. The metal pattern CI of the noise blocking film CIC may be electrically connected and attached to the ground pad GP of the circuit board 300 through a conductive adhesive or the like.

The metal pattern CI of the noise blocking film CIC is electrically connected to the ground pad GP from which the ground voltage is applied, thereby blocking electromagnetic waves of the display driver circuit 400 and the touch driver circuit 500. In this manner, it is possible to prevent or substantially prevent defects that the touch sensitivity of the touch sensing unit TSU deteriorates due to electromagnetic noise, etc. In one or more embodiments, by improving the design of the ground open area PDG such that the noise blocking film CIC is connected to the ground pad GP of the circuit board 300 without a level difference, it is possible to easily dispose and apply the noise blocking film CIC.

While some example embodiments have been described herein, those skilled in the art will appreciate that many variations and modifications can be made to the embodiments without substantially departing from the principles of the present disclosure. Therefore, the disclosed embodiments of the disclosure are to be interpreted in a generic and descriptive sense and not for purposes of limitation.

What is claimed is:

1. A display device comprising:

a display panel configured to display images through pixels in a display area;

a touch driver circuit configured to detect a touch of a user through a touch sensor of the display panel and generate touch coordinate data;

a plurality of data driver circuits configured to apply data voltage to the pixels in the display area;

a display driver circuit configured to control driving timing of the plurality of data driver circuits and image display timing of the pixels; and a noise blocking film covering a driver comprising the plurality of data driver circuits, the display driver circuit, and the touch driver circuit, and configured to block electromagnetic waves from the driver, wherein the noise blocking film is electrically connected to at least one ground pad through a panel protection plate.

2. The display device of claim 1, wherein the panel protection plate is on and attached to a rear surface of the display panel so as to conform to a shape of the rear surface of the display panel, wherein the panel protection plate comprises: a flat-type elastic member having a flat plate shape conforming to the shape of the rear surface of the display panel and attached to the rear surface of the display panel; and a metal plate attached to a rear surface of the flat-type elastic member and having a same shape as the flat-type elastic member.

3. The display device of claim 2, wherein the driver comprises:

a plurality of circuit films electrically connected to pads on a side of the display panel; and at least one circuit board electrically connected to the plurality of circuit films and configured to apply a ground voltage to the noise blocking film connected to the at least one ground pad through the at least one ground pad.

4. The display device of claim 3, wherein the noise blocking film comprises an anisotropic conductive film in which a thin-film metal pattern made of aluminum, copper, or an alloy material is patterned in a mesh pattern on a surface or included therein, or comprises a metal mesh having a thin-film structure in which a thin-film metal pattern made of aluminum, copper, or an alloy material has a mesh pattern.

5. The display device of claim 4, wherein the noise blocking film has a polygonal plane shape, wherein an outer surface at an end thereof is in contact with a front or side surface of the display panel, and an outer surface at an opposite end thereof is in contact with the panel protection plate arranged on the rear surface of the display panel while covering the driver, and wherein the metal pattern of the noise blocking film is electrically connected and attached to the at least one ground pad on the circuit board.

6. The display device of claim 3, wherein the at least one circuit board comprises:

a plurality of input and output pads;

a circuit area where at least one integrated circuit among the display driver circuit and the touch driver circuit is mounted;

a ground area where the at least one ground pad is patterned or located; and a ground open area that opens a vicinity and an outer area of the ground area such that the at least one ground pad and a ground lead pattern are electrically isolated from other floating patterns or other lead patterns and lines in the vicinity.

7. The display device of claim 6, wherein the ground open area is formed by removing all metal layers such that the at least one ground pad and the ground lead pattern are electrically isolated from other floating patterns or other lead patterns and lines in the vicinity.

8. The display device of claim 6, wherein the ground open area is formed by removing a metal layer from a base film or a base substrate made of non-conductive material and covering the base film or the base substrate with a protective coating layer, or is formed by removing the protective coating layer and the metal layer so as to be opened.

9. The display device of claim 6, wherein the noise blocking film has a polygonal plane shape to surround the at least one circuit board, the display driver circuit, and the touch driver circuit being bent, wherein an outer surface at an end of the noise blocking film is in contact with a front surface or a side surface of the display panel, and an outer surface at an opposite end thereof is in contact with the panel protection plate arranged on the rear surface of the display panel, and wherein a metal pattern of the noise blocking film is electrically connected and attached to the at least one ground pad on the circuit board.

10. The display device of claim 6, wherein the noise blocking film comprises an anisotropic conductive film in which a thin-film metal pattern made of aluminum, copper, or an alloy material is patterned in a mesh pattern on a surface or included therein, or comprises a metal mesh having a thin-film structure in which a thin-film metal pattern made of aluminum, copper, or an alloy material has a mesh pattern.

11. The display device of claim 10, wherein the noise blocking film has a polygonal plane shape, wherein an outer surface at an end thereof is in contact with a front surface or a side surface of the display panel, and an outer surface at an opposite end thereof is in contact with the panel protection plate arranged on the rear surface of the display panel and covering the driver, and wherein the metal pattern of the noise blocking film is electrically connected and attached to the at least one ground pad on the circuit board.

12. A display device comprising:

a display panel configured to display images through pixels in a display area;

a touch driver circuit configured to detect a touch of a user through a touch sensor of the display panel and generate touch coordinate data;

a plurality of data driver circuits configured to apply data voltage to the pixels in the display area;

a display driver circuit configured to control driving timing of the plurality of data driver circuits and image display timing of the pixels;

a panel protection plate attached to a rear surface of the display panel and conforming to a shape of the rear surface of the display panel; and a noise blocking film covering a driver comprising the plurality of data driver circuits, the display driver circuit, and the touch driver circuit, and configured to block electromagnetic waves from the driver, wherein the noise blocking film is electrically connected to at least one ground pad through a panel protection plate.

13. The display device of claim 12, wherein the driver comprises:

a plurality of circuit films electrically connected to pads on a side of the display panel; and at least one circuit board electrically connected to the plurality of circuit films and configured to apply a ground voltage to the noise blocking film connected to the at least one ground pad through the at least one ground pad.

14. The display device of claim 13, wherein the noise blocking film comprises an anisotropic conductive film in which a thin-film metal pattern made of aluminum, copper, or an alloy material is patterned in a mesh pattern on a surface or included therein, or comprises a metal mesh having a thin-film structure in which a thin-film metal pattern made of aluminum, copper, or an alloy material has a mesh pattern.

15. The display device of claim 13, wherein the at least one circuit board comprises:

a plurality of input and output pads;

a circuit area where at least one integrated circuit among the display driver circuit and the touch driver circuit is mounted;

a ground area where at least one ground pad is patterned or disposed; and a ground open area that opens a vicinity and an outer area of the ground area such that the at least one ground pad and a ground lead pattern are electrically isolated from other floating patterns or other lead patterns and lines in the vicinity.

16. An electronic device comprising a display device, the display device comprising:

a display panel configured to display images through pixels in a display area;

a touch driver circuit configured to detect a touch of a user through a touch sensor of the display panel and generate touch coordinate data;

a plurality of data driver circuits configured to apply data voltage to the pixels in the display area;

a display driver circuit configured to control driving timing of the plurality of data driver circuits and image display timing of the pixels; and a noise blocking film covering a driver comprising the plurality of data driver circuits, the display driver circuit, and the touch driver circuit, and configured to block electromagnetic waves from the driver, wherein the noise blocking film is electrically connected to at least one ground pad through a panel protection plate.

* * * * *